(12) United States Patent
Hater et al.

(10) Patent No.: US 8,292,543 B2
(45) Date of Patent: Oct. 23, 2012

(54) MULTI-PLANAR GAS RECOVERY BIOREACTOR

(75) Inventors: Gary R. Hater, Cincinnati, OH (US); Kevin M. Mieczkowski, Goshen, KY (US); Roger Green, Cincinnati, OH (US); John A. Barbush, Goshen, KY (US)

(73) Assignee: Waste Management, Inc., Houston, TX (US)

( * ) Notice: Subject to any disclaimer, the term of this patent is extended or adjusted under 35 U.S.C. 154(b) by 851 days.

(21) Appl. No.: 12/193,863

(22) Filed: Aug. 19, 2008

(65) Prior Publication Data

US 2009/0269140 A1   Oct. 29, 2009

Related U.S. Application Data

(60) Provisional application No. 61/048,395, filed on Apr. 28, 2008.

(51) Int. Cl.
*B09C 1/00* (2006.01)

(52) U.S. Cl. .............................. 405/129.95; 405/129.57
(58) Field of Classification Search ............ 405/129.95, 405/129.57
See application file for complete search history.

(56) References Cited

U.S. PATENT DOCUMENTS

| 4,521,517 | A  | * | 6/1985 | Gauthier ................. 435/290.1 |
| 5,857,807 | A  | * | 1/1999 | Longo, Sr. ................ 405/129.7 |
| 2004/0062610 | A1 | * | 4/2004 | Hater et al. ............. 405/129.95 |
| 2004/0191755 | A1 | * | 9/2004 | Kemper et al. .................. 435/3 |
| 2006/0029473 | A1 | * | 2/2006 | Khire .................... 405/129.2 |

* cited by examiner

*Primary Examiner* — John Kreck
(74) *Attorney, Agent, or Firm* — McDonnell Boehnen Hulbert & Berghoff LLP

(57) ABSTRACT

A bioreactor including one or more features that improve bioreactor liquid infiltration and gas recovery including a porous material layer having a layer of first porous material including a trench, a second porous material located in the trench and extending beyond the top surface of the layer of first porous material and perforated gas recovery piping located in the second porous material.

19 Claims, 8 Drawing Sheets

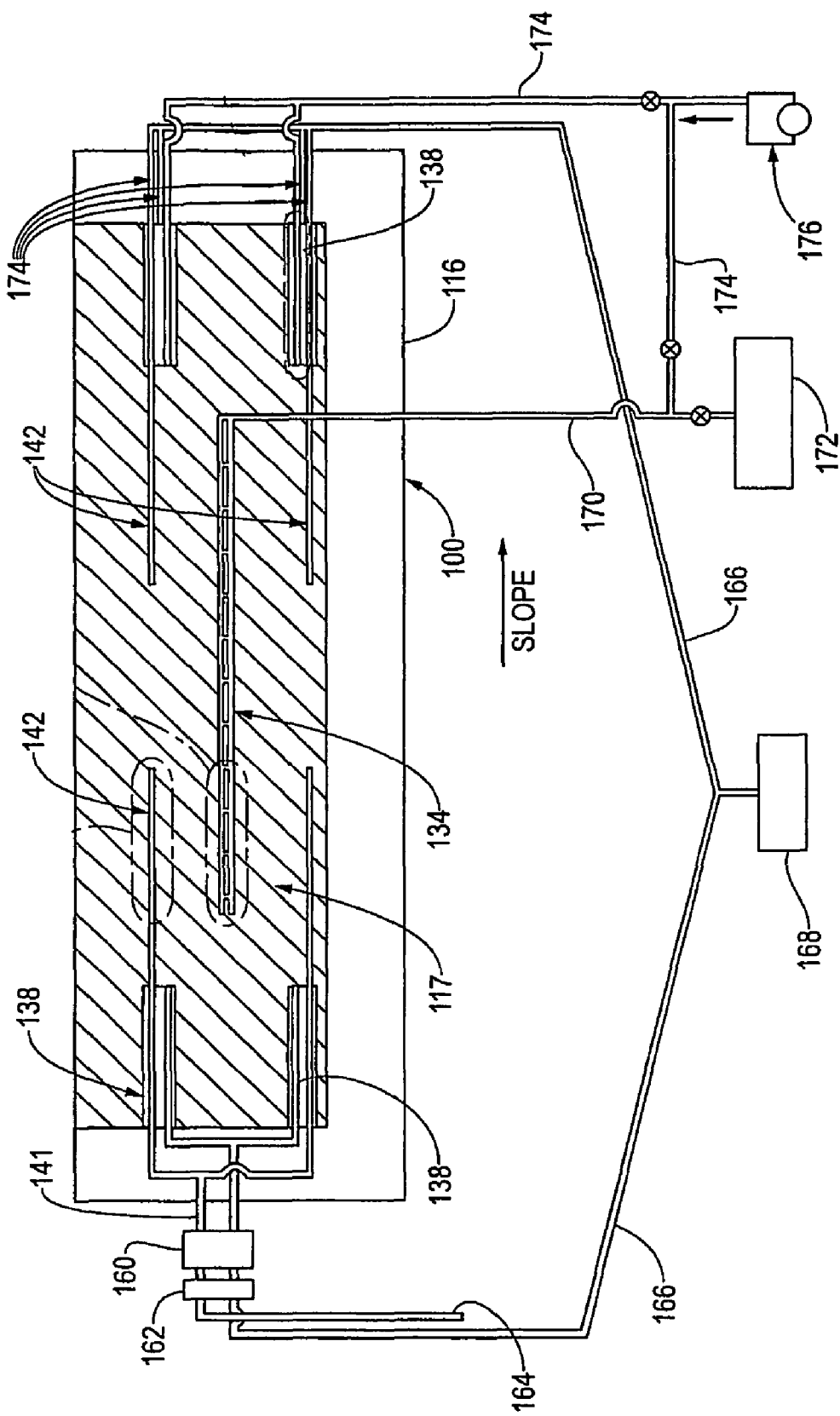

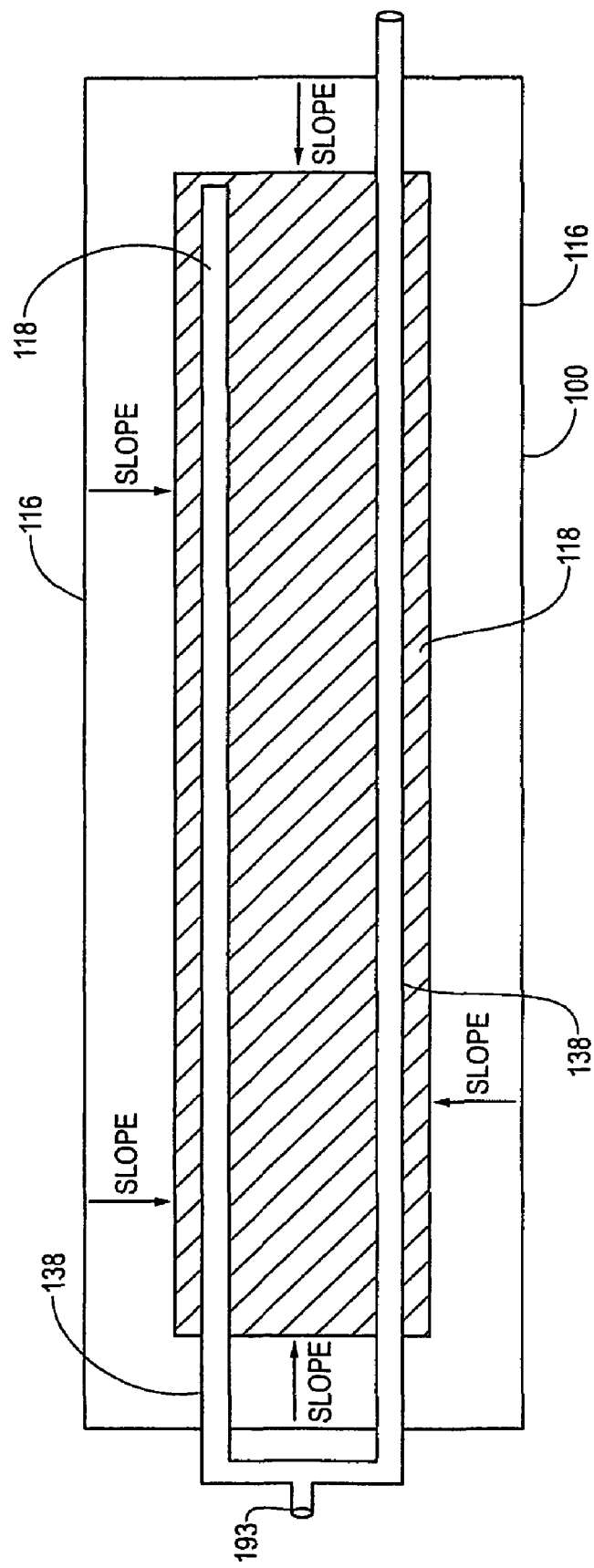

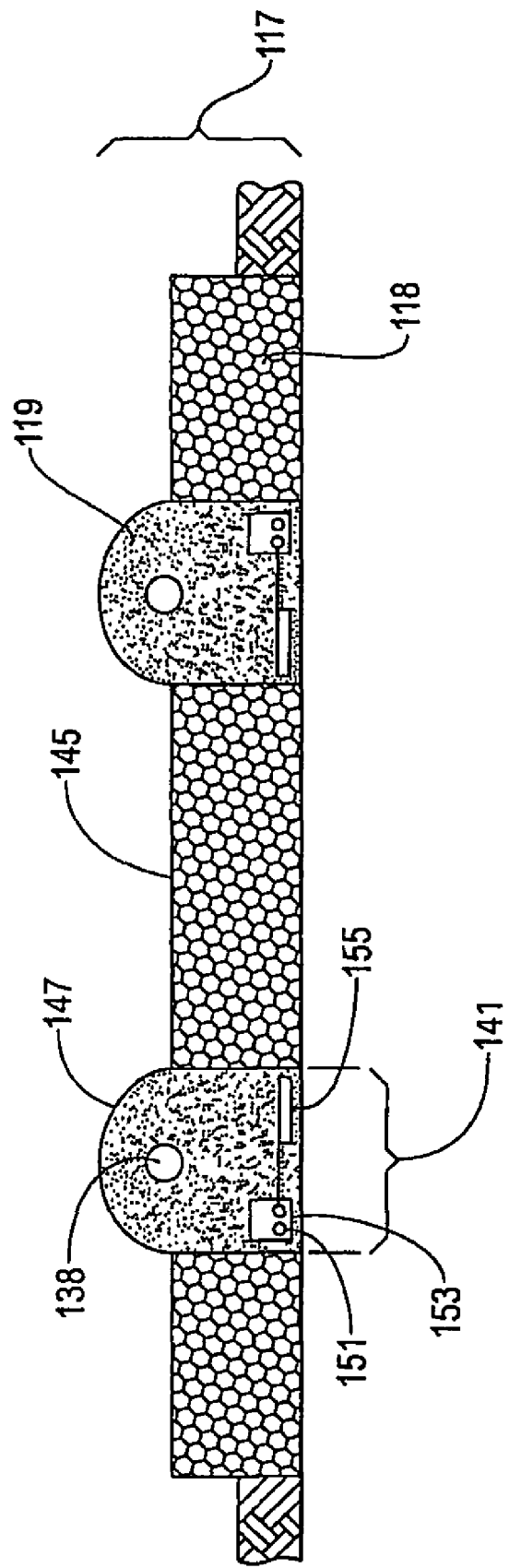

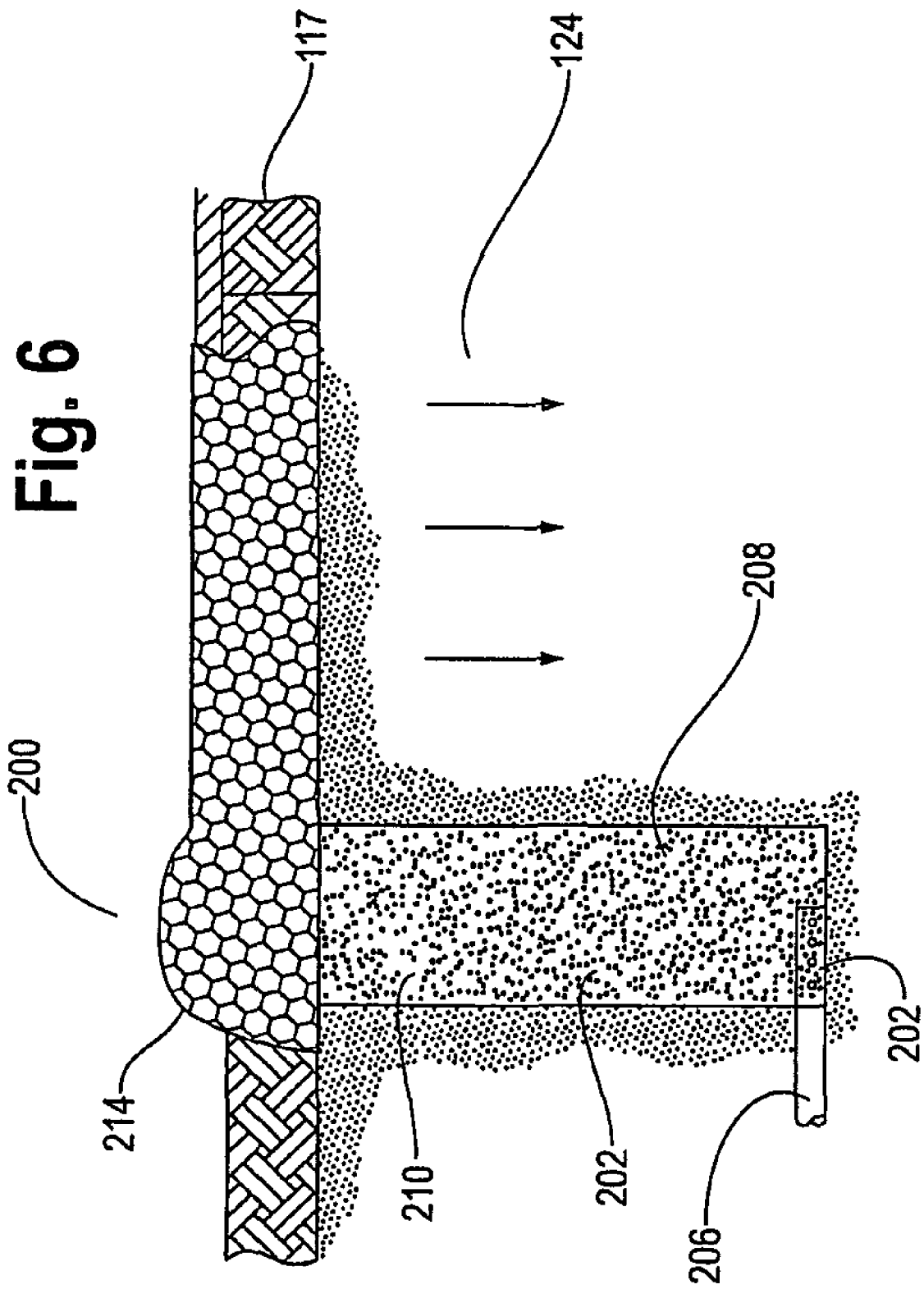

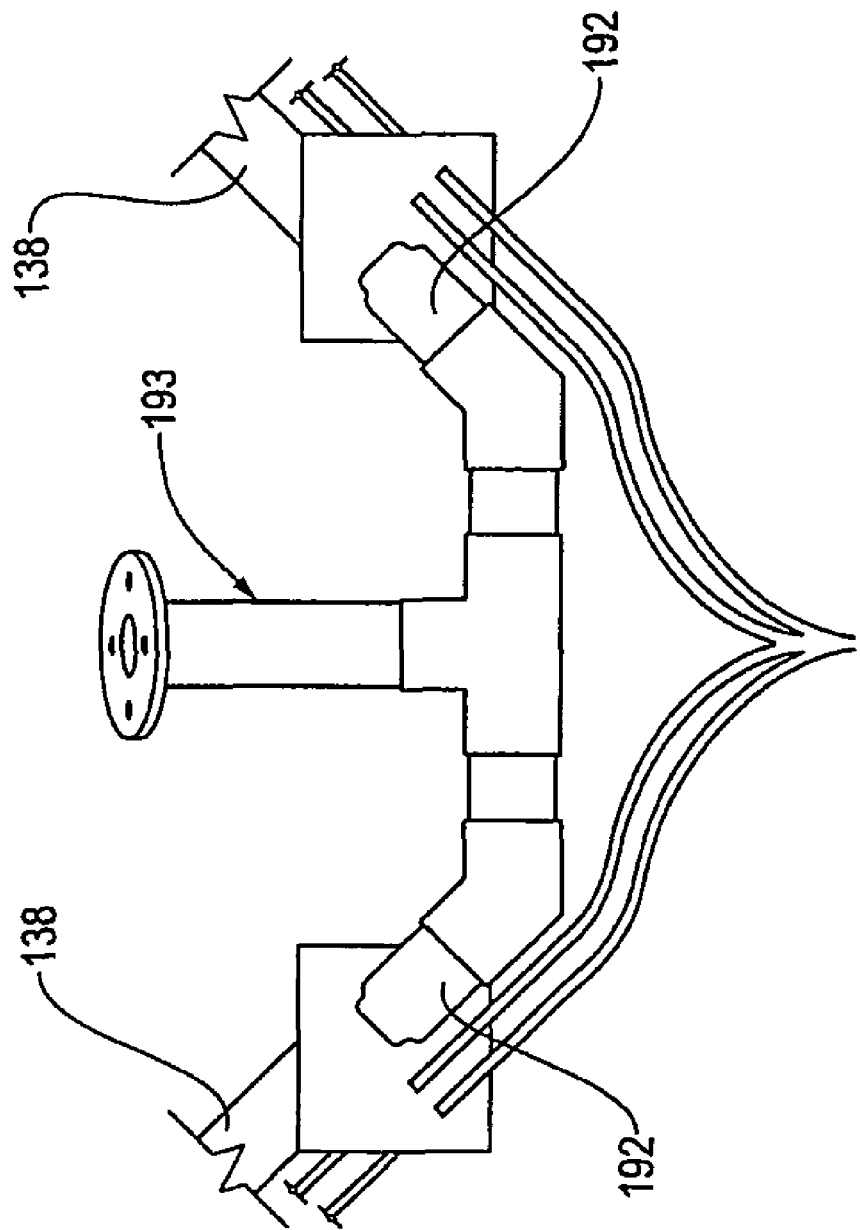

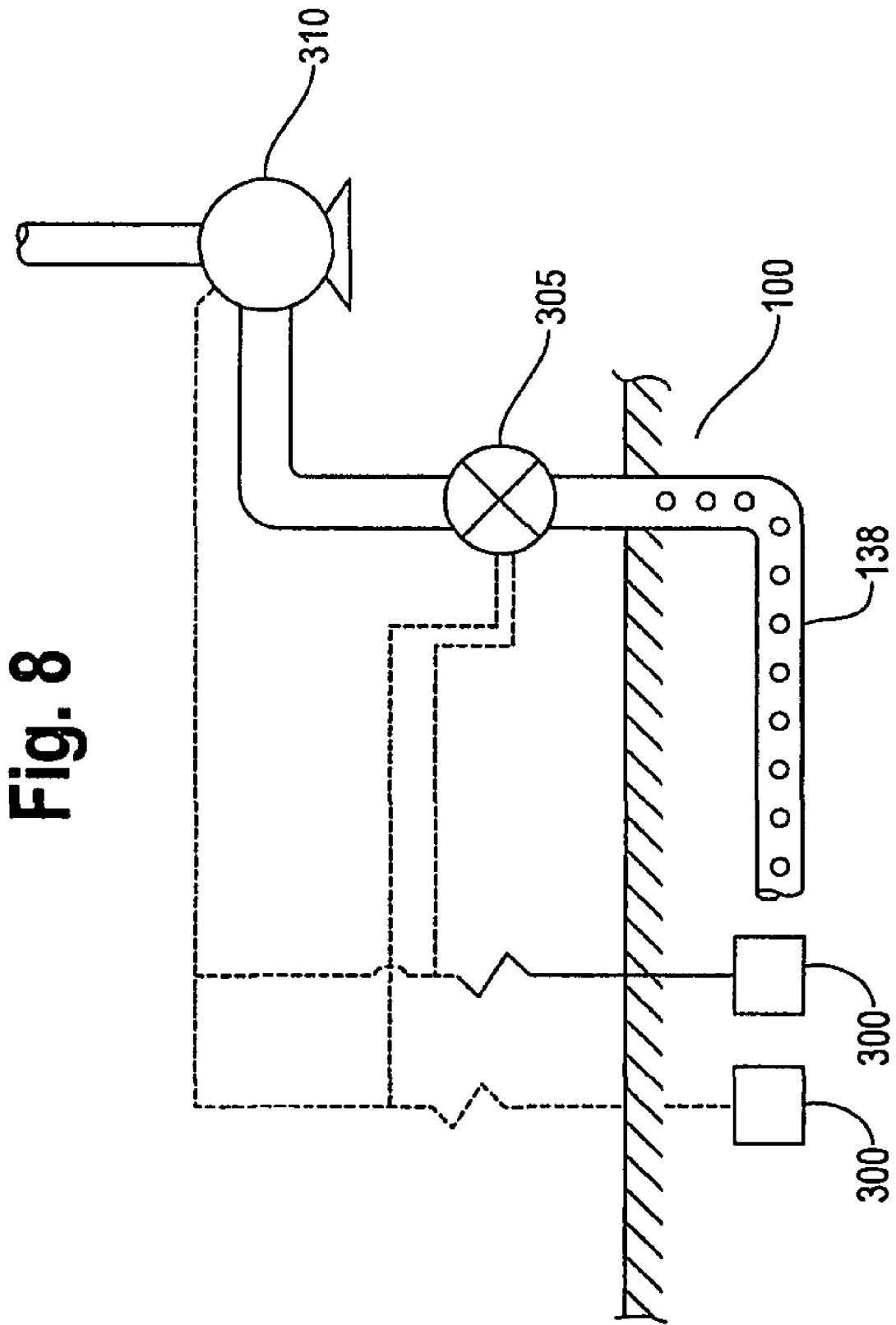

MULTI-PLANAR GAS RECOVERY BIOREACTOR

This application claims priority to U.S. provisional patent application Ser. No. 61/048,395 filed on Apr. 28, 2008.

BACKGROUND OF THE INVENTION (1) Field of the Invention

The present invention relates to bioreactors including improved liquid distribution and gas collection features. The present invention also includes wet landfills and landfills having one or more bioreactors of this invention.

(2) Description of the Art

About 15 years ago, landfill owners began using leachate recirculation as a remediation method. Generally accepted techniques are to inject leachate into landfills using horizontal leachate injection piping, vertical wells, or by applying leachate to the working landfill face surface. Distributing leachate over a large area has always been a problem. Often the leachate distribution piping becomes fouled with slime, fines or calcium/iron complexes from landfill material surrounding the leachate injection sites.

Typical landfills also include piping and wells for recovering valuable landfill gases that contains methane. Over 90% of the landfill gas recovery systems in the United States and Canada use vertical gas extraction wells. Standard practice is to bore a 30" to 36" diameter well into a landfill, insert a 6" to 8" diameter perforated gas extraction pipe into the well and then fill the well with stone. One problem with vertical gas extraction wells is that the gas pipes fill with water and recirculated leachate. If the water is not removed, the gas extraction well becomes useless. The standard method of removing water from vertical gas extraction wells is to associate expensive pumps with the gas extraction wells to keep the wells free of liquids.

Another problem with landfill remediation is how to accelerate biological degradation and increase gas production. One way to accelerate landfill biodegradation is to ensure that the landfill moisture content remains high and/or to inject air into the landfill. In an effort to enhance landfill waste biodegradation rates, landfill operators in the United States have been actively recirculating leachate and pursuing bioreactor landfill practices that utilize the addition of liquids from sources outside of the landfill to increase the moisture content of the waste. The preferred waste moisture content range of these advanced sanitary waste cells is 35% to 45% (wet weight basis). With the onset of over 150 leachate recirculation projects in the U.S. and over 20 bioreactor landfills, an increase in maintenance costs in the vertical well fields and a potential for increased surface emissions have created problems. Classic vertical gas extraction wells fill with leachate and become useless. This has resulted in the need for the installation of automatic pump out systems and an increased frequency of maintenance to reduce surface emissions.

Several advances in landfill remediation have been recently made. U.S. Pat. No. 6,742,962 discloses a horizontal infiltration and gas recovery system. The system is designed to eliminate some of these problems with gas recovery in wet landfill systems. While the system is an improvement over vertical gas recovery systems it still requires liquid pumps associated with the gas recovery wells and the system is subject to oxygen intrusion if the landfill cover soil is not properly compacted. Another issue with this system is the potential for limited liquid coverage due to non-homogeneous waste placement and chemical blinding of the trenches.

There has been some work in developing landfill bioreactors that have horizontal gas extraction piping systems. Such a landfill gas collection system is described in U.S. Pat. No. 7,118,308, the specification of which is incorporated herein by reference. The '308 patent system covers an area of up to 80% of the landfill surface of a constructed lift of waste with a permeable material as illustrated in FIG. 1.

Despite these advances in landfill bioremediation, there remain problems with existing leachate recirculation and/or landfill gas recovery systems including (1) the continued dependency on vertical gas wells; (2) the requirement to pump liquids out of vertical gas wells as the infiltration field became saturated; (3) historically, infiltration systems do not allow for surface application initially followed by deep infiltration and the landfill is filled for the apparatus is covered; (4) the need for a system that would allow for infiltration and gas recovery simultaneously. Furthermore, there is a need to prevent the accumulation of and/or to drain liquids from the gas collection system. There is also a need to improve gas recovery for the saturated infiltration field. Additionally gas systems in older wet landfills are prone to maintenance issues related to settling of the gas system.

SUMMARY OF THE INVENTION

The bioreactors and landfill gas extraction well systems of this invention are an improvement to the original Multiplane™ design. The improved bioreactors of this invention reduce the amount of landfill surface covered by the bioreactor while maintaining gas extraction rates. In addition, landfill gas is collected at horizontal headers that exit the landfill at ends of a bioreactor cell. The systems of this invention include one or more planes of porous materials sloped toward one or both ends for gravity draining of excess liquids or leachate.

In one aspect, this invention is a bioreactor comprising a compostable material and at least one bioreactor cell located in the compostable material wherein the bioreactor cell further comprises: a porous material layer having a length X, a width Y, a bottom surface and a top surface and at least one trench; a second porous material located in the first porous material in the at least one, the second porous material extending out of the at least one trench and above the top of the first porous material layer; and at least one perforated gas collection pipe that is located in and substantially covered by the second porous material. In this embodiment the first porous material and the second porous material may be the same.

Another aspect of this invention is a bioreactor comprising a compostable material and at least one bioreactor cell located in the compostable material wherein the bioreactor cell further comprises: a porous material layer having a bottom surface and a top surface; two or more perforated gas collection pipe located in the material layer wherein the two or more gas collection pipes are essentially parallel to one another and wherein each of the two or more perforated gas collection pipes include an outlet; and at least one gas riser that is associated with the outlet of at least two perforated gas collection pipes.

Yet another aspect of this invention is a bioreactor comprising a compostable material and at least one sloped bioreactor cell located in the compostable material wherein the bioreactor cell has a first end and a second end wherein the first end lies above the second end; and a leachate drain located at the bioreactor second end the leachate drain including a trench, at least one leachate collection pipe located in the trench, a first porous material located in the trench and a second porous material covering the trench.

Still another aspect of this invention is a method for constructing a landfill bioreactor comprising the steps of: placing a layer of compostable material in a landfill; is locating a layer of a first porous material on top of the compostable material layer; removing a portion of the first porous material from the porous material layer to form at least one trench; placing a second porous material into the at least one trench; placing a gas collection pipe on top of the second porous material; and covering the gas collection pipe with additional second porous material to form a second porous material covered gas collection pipe.

DESCRIPTION OF THE FIGURES

FIG. 3 is a top view of a bioreactor of this invention including some gas extraction piping configuration options;

FIG. 4 is a top view of a bioreactor embodiment of this invention;

FIG. 5 is a cross section of a bioreactor embodiment of this invention showing a first porous material, and gas extraction piping located in a second porous material as well as temperature and pressure sensors and conduit runs;

FIG. 6 is a cross section view of a leachate drain embodiment of this invention located at a lowermost elevation of a bioreactor. The depth of the trench 202 which should be 5 feet or more and preferably about 10 feet or more allows for settlement of the bioreactor towards the leachate extraction piping 206 (in the direction of arrows) without impacting the operation of the leachate drain;

FIG. 7 is an embodiment of a piping manifold for uniting two horizontal gas extraction well into a single vertical riser; and FIG. 8 is a schematic of a sensor and control system useful in bioreactor containing landfills.

DESCRIPTION OF THE INVENTION

The present invention relates to bioreactors including one or more features that improve bioreactor liquid infiltration and gas recovery. The bioreactors of this invention have small lateral footprints in comparison to the landfill compostable material that they are placed in that surprisingly create a large area for liquid infiltration and gas recovery. The bioreactors of the present invention solve one or more than one of the following problems encountered in landfill liquid infiltration systems—with or without gas recovery—and/or provide one or more of the advantages.

Use of contiguous gas extraction piping allows for the use of less piping overall.

Placing gas collection piping towards the top edge of the porous material layer prevents watering (the filing of the porous layer or space with standing liquid) out of the gas collection piping.

The systems and methods of this invention provides for the early placement of gas extraction systems that allows landfill operations to bring landfills into compliance with air emission standards without having to raise vertical pipes.

Connecting the outlets of two gas collection pipes at an end of the bioreactor into a single vertical riser decreases the number of surface penetrations, but still allows for liquid addition and aeration.

Decreasing the width of the multiplane gas system allows for its placement in uneven surfaces and at the toe of a slope. Indeed the inventors have discovered that it is possible to maintain the utility of a bioreactor even after decreasing its width to less that 60 feet wide in which case only one gas extraction or liquid addition pipe may be installed, A novel lechate drain placed at the lower end of the bioreactor allows for bioreactor and/or landfill settling over the life of the bioreactor without destroying or impacting the effectiveness of the lechate drain. The leachate drain replaces horizontal gas and leachate collection pipes that are destroyed and/or become non-functional as the landfill settles.

Leachate drainage can be from both ends of the bioreactor if the span of the bioreactor exceeds about 1000 feet.

Optional instrumentation allows for measurement of gas pressure and temperature inside the bioreactor. The use of pressure sensors make it possible to increase gas extraction rates from the system in the event of a gas pressure build up. In on embodiment, in the event of increased pressure an alarm will go off asking for manual opening of the valves or an, automated valve system can be used. Temperature sensors allow for fire avoidance during aeration.

Elimination of the geotextile cover.

Use of pressure sensors and other feedback apparatus such as gas chromatograph allows for the remote operation of a control valve to control gas removal flow rates.

Figure 1:
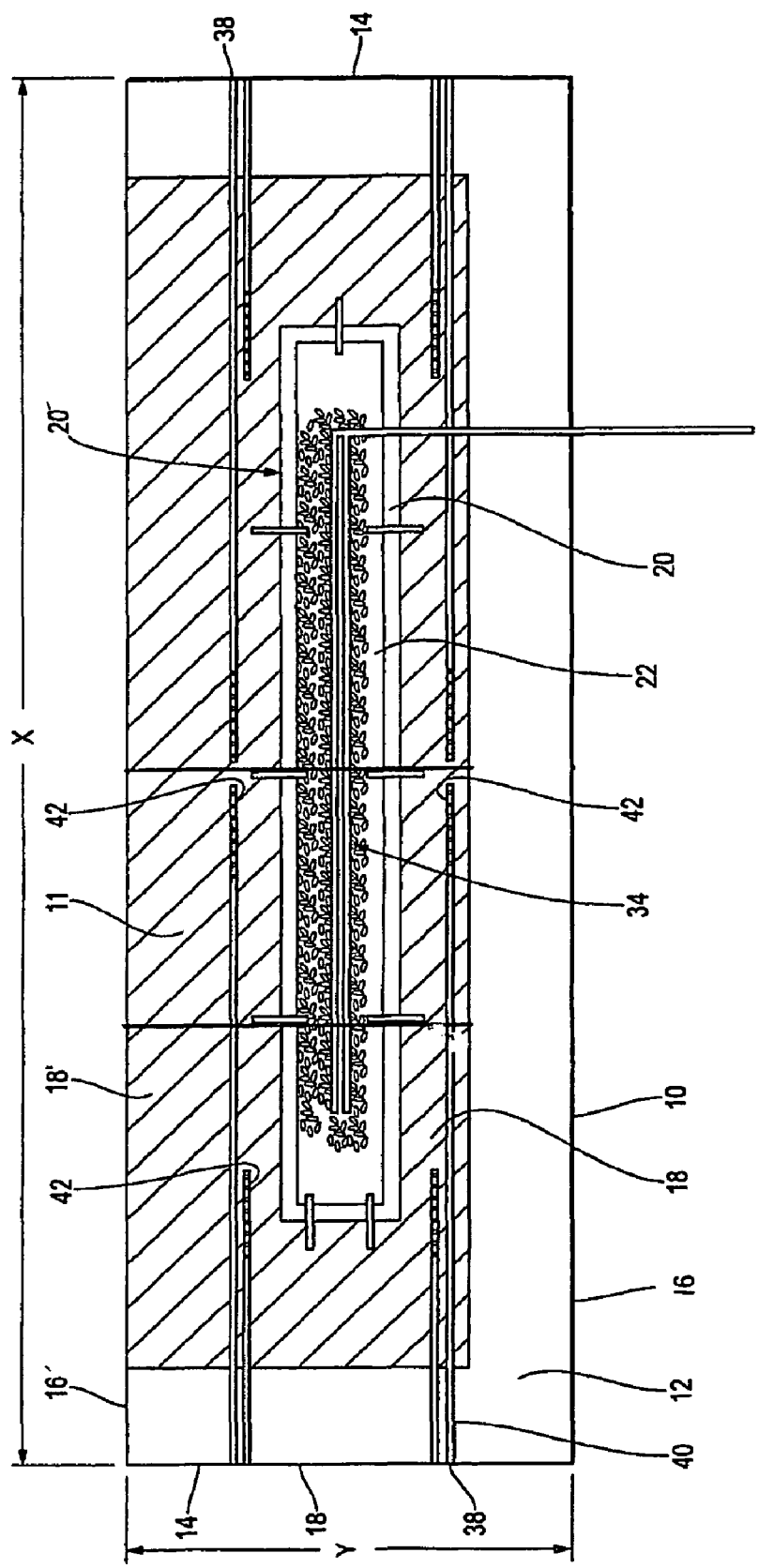
FIG. 1 is a top view of a prior art embodiment of an infiltration/gas recovery bioreactor including berms and a central material layer which are not required in the bioreactor embodiments of this invention.

FIG. 1 is a top view of a prior art bioreactor 10. Bioreactor 10 shown in FIG. 1 includes a confining layer 12 located at the ends 14 and sides 16 of the bioreactor 10. Inner side 11 of bioreactor 10 includes a porous material layer 18' contiguous with the sidewall or slope of an adjoining bioreactor cell. Inside confining layer 12 is a porous gas recovery layer 18. Porous gas recovery layer 18 may optionally be covered with a geotextile sheet. Porous gas recovery layer 18 defines a gas collection volume in which gas collection piping is preferably located. Porous gas recovery layer 18 will vary in length and width depending upon the dimensions of the bioreactor. Prior art bioreactor 10 further includes a soil or clay berm 20 placed inside the porous gas recovery layer 18 to force liquids downward thereby inhibiting liquids from entering the gas collection system. Berm 20 may be continuous or discontinuous. In FIG. 1 a continuous berm surrounds a liquid infiltration area that has a central core 22 of liquid permeable material that is preferably several feet wide. Central core 22 may be as narrow as about 10 feet and as wide as about 500 feet or wider. Gas collection pipes 38 including a non-perforated portion 40 and a perforated portion 42 may enter the bioreactor from both ends. Liquid infiltration piping 34 is also located in the bioreactor.

The methods and systems for the present invention employ improved bioreactors the inventors call Multiplanes™. Multiplanes are bioreactors that include at least one layer of compostable waste materials divided by layers of porous materials. The combination of at least one porous material layer and one compostable material layer defines a bioreactor. The bioreactors 100 of the present invention are discussed in the context of FIGS. 2-7. Bioreactors 100 are generally constructed in landfills as horizontal lifts. In most instances, the bioreactors of this invention will be installed as lifts in municipal solid waste landfills. Once a layer of compostable material is in place, a porous material layer will be applied to a portion of the surface area of the compostable material layer. Then a second compostable material layer such as municipal solid waste layer will be placed over the porous material layer. When the bioreactors are placed in a municipal solid waste landfill, the bioreactor footprint—defined by the dimensions of the porous material layer—will be smaller than the footprint formed by the municipal solid waste. If the bioreactor is installed on top of the last landfill lift, then the bioreactor can be covered with a cap material as discussed below. Alternatively, the bioreactors of this invention may be stand alone bioreactors that are constructed independently from a landfill in order to remediate compostable materials including, but not limited to municipal solid waste, yard waste, agricultural waste, and so forth as well as combinations of different types of waste materials. For purposes of this invention, the term compostable material should be broadly interpreted to include any liquid or solid material that can act as a food source for aerobic and/or anaerobic microorganisms under aerobic and/or anaerobic compositing conditions.

Figure 2:
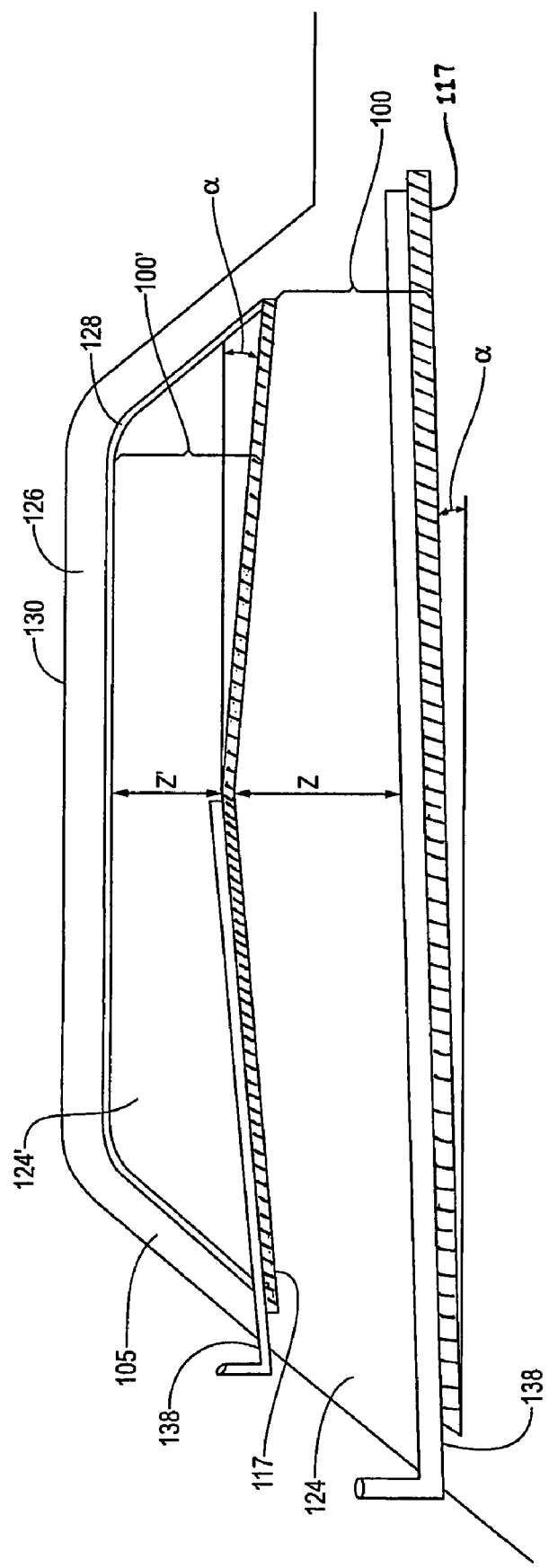
FIG. 2 is a cut-away side view of a landfill including several bioreactor embodiments of this invention.

FIG. 2 is a cut-away side view of a landfill including a plurality of bioreactors 100/100' of this invention wherein bioreactors 100/100' are located on different horizontal planes. Each bioreactor comprises a porous material layer 117 and a compostable material layer 124 on top of porous material layer 117. When bioreactors 100/100' are located on different horizontal planes, then they may be separated by a depth Z of from about 10 feet to 100 feet or more but preferably from about 15 feet to about 25 feet. When a bioreactor 100' is located in the top-most lift of a landfill, then it is preferred that the bioreactor includes a compostable material layer 124' having a depth Z' of from about 5 feet to about 50 feet and preferably from about 5 feet to 20 feet. Compostable material layer 124' forms a buffer zone between the top-most bioreactor 100' and the landfill surface that inhibits oxygen infiltration into the bioreactor, and/or that allows for better landfill surface grading. Bioreactors located at the top-most lift of a landfill may also be covered with a cap material 126 that is preferably selected from soil or clay. The optional cap material will generally have a thickness of from about 1 foot to 10 feet or more with a thickness of from 2 feet to 5 feet being more preferred. An optional barrier material layer 128 may be located between cap material 126 and bioreactor 100 and preferably between cap material 126 and compostable material layer 124. An example of a useful barrier material layer 128 would include a plastic sheet material having a thickness of from about 10 to about 40 mils.

It is preferred however that the landfill top include a sloped surface 130 as shown in FIG. 2. Sloped surface 130 should be great enough to allow rain water to run off of the landfill without causing flooding. A slopes surface 130 having a grade of from 1:1 to about 10:1 or more would be useful with slopes ranging from about 2.5:1 to 5.6:1 being more preferred.

The landfill shown in FIG. 2 includes two bioreactors 100 and 100' each of which are non-horizontal. The term "non-horizontal" as used herein means that bioreactors 100 have an angle a that is at most 10 degrees from horizontal and no less than about ½ a degree from horizontal. More preferably angle α is no more than 6 degrees from horizontal and no less than about 1 degree from horizontal and most preferably 1-2 degrees from horizontal. Non-horizontal bioreactor are preferred because corresponding porous gas collection piping 138 will run in or along the surface of porous material layers also be non-horizontal which will allow water that infiltrates the gas collection piping to drain.

FIG. 2 shows two types of non-horizontal bioreactors. The first bioreactor 100' slopes in at least two different directions from an approximate center point. When the length of a bioreactor is great, then it will be useful to slope the bioreactor in at least two different directions. This allows for the placement of two lengths of sloped gas collection piping 138 in the bioreactor instead of one long length as with bioreactor 100 of FIG. 2. Moreover, the landfill topography may warrant sloping bioreactor 100 in several directions to facilitate the drainage of water from porous gas recovery piping 138. A second bioreactor 100 shown in FIG. 2 slopes in just one direction. In both bioreactors 100 and 100' shown in FIG. 2, gas recovery piping 138 emerges from an edge 105 of the landfill where it can be associated with a piping manifold.

FIGS. 3-4 are top views of bioreactor embodiments of this invention. Bioreactor 100 of FIG. 3 is installed in a sloped landfill and includes liquid infiltration piping 134 and gas collection piping 138. Gas collection piping 138 includes a perforated portion 142 and an end that emerges from side 116 of bioreactor 100. The emerging ends of two parallel gas collection pipes 138 are united at riser 193 shown in FIG. 7. In FIG. 3 piping 141 enters a valve vault 160 including valves for directing liquid and gases withdrawn from gas collection piping 138 to the appropriate collection system. A barometric trap 162 for collecting liquids that drain from sloped gas collection piping 138 lies downstream of valve vault 160. A conduit 164 links each barometric trap 162 with typical leachate collection system. A conduit 166 links gas collection piping 138 with a landfill gas processing unit 168. Landfill gas processing unit 168 may be selected from any devices known to those of ordinary skill in the art for processing landfill gases. Such processing units include flares, gas recovery systems in which the gasses are scrubbed and burned for heat or to operate equipment and so forth.

The landfill bioreactor of FIG. 3 further includes a liquid injection conduit 170 associated with liquid infiltration piping 134. Liquid injection conduit may be used to supply leachate, water or other liquids from a tank 172. The landfill bioreactor of FIG. 3 further includes an optional air injection conduit 174 associated with air compressor 176. Air injection conduits 174 can be used to inject compressed air into the landfill via liquid infiltration piping 134 and/or gas collection piping 138. In a preferred embodiment, liquid infiltration piping 134 is a 3" to 6" diameter HDPE perforated double pipe system.

FIG. 5 is an end cross-section view of a landfill bioreactor of this invention including a porous material layer 117 having a layer of first porous material 118 and a second porous material 119. The second porous material 119 is optional and includes perforated gas collection piping 138. The porous material layer 117 portion of the bioreactor shown in FIG. 5 is constructed by initially placing a first layer of porous material 118 over the entire width Y and the entire length X of the bioreactor. The bioreacotor length and width can vary. The bioreactor can be built in lateral sections based on elevation and concern for odors. The depth or height Y of the first layer of porous material 118 is variable, but will typically range from 6 inches to 4 feet or more. A typical layer of first porous material 118 will have a depth of from about 12 inches to 36 inches and more commonly about 24 inches. The first porous material layer must be deep because after loading compostable material and additional bioreactors on top of the bioreactor shown in FIG. 2, the first layer of porous material 118 will be compressed to a depth of from for example 24 inches to as little as 12 inches.

Once porous material layer 118 is in place, layer 118 is excavated in the areas where the perforated gas recovery piping 138 will be located to form a trench 141. A second porous material 119 is placed in the trench the second porous material layer depth is about level with the top surface 145 of the layer of first porous material 138. Perforated gas collection piping 138 is then placed on top of the partially installed second porous material 119 and the more of the second porous material is added to form a mound 147 over perforated gas recovery piping 138. Mound 147 will have a height above to surface 145 of the layer of first porous material 118 of from about 0 inches to about 24 inches or more. The placement of gas collection piping 138 at or near the top of the layer of first porous material 118 prevents flooding out of perforated gas recovery piping 138. This improvement prevents watering out at the lowest elevation of the bioreactor.

Optional sensors such as thermocouples pressure sensors and oxygen sensors 151 and 153 may be located in trenches 141. In addition, a conduit 155 that directs power to sensors 151 and 153 may also be placed in trench 141. Sensors 151 and 153 and conduit 155 may be placed on top of or within the second porous material 119. However, it is preferred that sensors 151 and 153 and conduit 155 are located in trench 141 prior to the addition of second porous material 119 into trench 141.

Another improvement to the bioreactors of this invention is the addition of a leachate drain 200 at the lowest elevation of a bioreactor. A lechate drain embodiment is shown in FIG. 6. Preferably after bioreactor 100 is constructed and the second porous material is laid along with instruments and piping, a trench 202 is constructed in the compostable material. A perforated portion 204 of lechate drain piping 206 is located towards the bottom portion 208 of trench 202. Trench 202 is then filled with a liquid porous material 212. Finally the bioreactor porous material layer 117 is extended to cover the filled trench or the liquid porous material 212 or a second liquid porous material is applied to the top of the trench to form a small mound 214. Mound 214 and trench 202 allow the bioreactors including compostable landfill material to settle or without causing the gas collection system to become non-operable. Finally, a fluff lift 216 is placed on top of the leachate drain 200 with a dozer to a depth of about 5 feet or more.

The many porous materials discussed above may be selected from any materials used in the landfill or bioreactor arts to form layer or zone which a gas or liquid can easily permeate. Some examples of useful porous materials include, but are not limited to tire chips, gravel, stone, wood chips, glass, cullet, selected construction and demolition debris, or any combination thereof. A preferred gravel will be ¾" to 1¼" river gravel. The porous materials discussed above may be the same or different materials. For example, first porous material 118 and second porous material 119 may be the same porous material or they may be selected from different materials.

Another improvement of this invention is the joining of two or more perforated gas recovery pipe ends 192 to vertical riser 193 as shown in FIG. 7. This design eliminates one gas well penetration at each end of bioreactor 100. Linking gas pipes into a single riser has surprising been found to have little impact on the ability to adjust off-gas quality. Gas riser is typically on the slope, this allows for easy construction and avoids running long lengths of vertical pipes.

FIG. 8 is a schematic of the landfill bioreactor monitoring and control system embodiment of this invention. FIG. 8 shows a landfill bioreactor 100 in which are placed sensors 300. Sensors 300 may be selected from thermacouples, oxygen sensors, methane sensors, pressure sensors and any combinations thereof. Sensors 300 may be connected to local or remote monitors such as displays or controllers which are capable of displaying and/or recording the sensor. In addition, the sensor output can be used directly or indirectly to control the volume of gas being withdrawn from the landfill. In one method, the sensor output can be used to control a control valve to increase or reduce the output of landfill gas being extracted from the bioreactor. In another embodiment, the sensor output can be used to control the landfill off gas rate by controlling compressor 310 in an on off manner or by controlling the compressor motor speed.

In a preferred embodiment, sensor 300 is a pressure sensor that interacts with valve 305 or with compressor 310 to control the subsurface bioreactor pressure at 0 or slightly negative pressure. Alternatively, the output of an oxygen sensor can be used to control the landfill gas extraction rate via valve 305 of compressor 310. In this embodiment, the methane content of the landfill will be controlled at from 48 to 60 percent preferably from 52 to 56 percent while the oxygen contents of the landfill will be kept at about 0.

The sensors 300 can also be used as safety devices to completely halt the extraction of gas from the landfill by closing valve 305 whereby stopping compressor 310. Such an emergency situation could occur where oxygen was detected in the landfill off gas, where the temperature of the landfill was increasing signifying the initiation of combustion within the landfill or when the methane in the landfill off gas reaches certain levels.

The bioreactors of this invention are particularly useful when constructed in landfills. The landfill surface is prepared by removing the cover over the entire surface or in sections. Once the slope is in place, a layer of first porous material—such as tire chips—are placed over the entire bioreactor area. The layer of tire chips is usually extended to cover the porous material 210 in leachate drains 200 in order to prevent leachate breakouts. As noted above, the multiplanes are typically placed within 15 feet of the final grade. We have discovered that the use of a geotextile above the tire chip layer is unnecessary and can be omitted to prevent ponding and blinding above the tire chips.

While the inventors have evaluated the use of contiguous bioreactor's across the entire subsurface of a landfill with very good gas collection results and minimum emissions, such a system can substantially increase the overall gas system construction cost. In the present invention the bioreactor cells are spaced across the subsurface in an interrupted pattern with spacing between planes of 60' to 100. While the desired lateral spacing can be zero, this may not be practical in some instances. Where spacing is required because of cost or operational activity then each multiplane is separated by 60' to 100' of compostable material. Vertically multiplanes are placed in layers on the surface of the landfill as it is constructed a minimum of one time but can have multiple layers based on the ultimate height of the landfill, the regulations requiring early gas collection, and the length of the outside slope. Short landfills under 100' in height generally require one layer of multiplanes. Wet landfills, like bioreactors, require one or more additional levels to be put in place and landfill cells with outboard slopes more than 200' in length require additional multiplanes.

Bioreactors 100 of this invention may include one or more gas collection pipes 138. In short bioreactors—bioreactors less than 500' to 600' in length—only single short pipes of 150 feet to 200 feet in length each need to be placed so that they are located in the porous gas recovery layer 117. Typically gas collection pipes 138 will include a solid (non-perforated) portion 140 and a perforated portion 142. The length of the solid and perforated portions will vary depending upon the length of bioreactor 100. Typically gas collection pipe will have a length that is from about 50% to about 80% or more of the length of the bioreactor. The length of the solid portion 140 will be from about 10% to about 50% of the total length of the gas collection pipe 138. The diameter of gas collection pipes 138 will typically vary from about 2 inches to about 12 inches in diameter and more preferably from about 6 inches to 8 inches. 8 inch piping is preferred in the present invention.

Gas collection pipes 138 can also be used for external air addition to the bioreactor. Compressed air addition for short periods of time up to about 120 days or more and perhaps yearly may be useful to facilitate accelerated aerobic bacterial degradation of the compostable material and generate heat as set forth in U.S. Pat. No. 6,288,676, the specification of which is incorporated herein by reference.

Any type of piping that can be perforated may be used in the bioreactors of the present invention as liquid infiltration or gas extraction piping. Because of cost and corrosion issues, it is preferred that the piping is a plastic or resin piping material such as HDPE, SDR17, CPVC, or PCV-schedule 80 if the piping is buried less than 60 feet in the landfill. If the piping will be buried deeper than 60 feet, tile piping that is bedded in stone or SDR11 piping is preferred. In some cases the piping can be enclosed in reinforced manifolds that allow heavy equipment to travel over the piping without damaging the piping while the pipes are still at a shallow location in the landfill. Black iron piping, HYEX® (a registered Trademark of Landfill Services Corp.) piping, or other lo reinforced material piping can also be used.

From the foregoing it will be appreciated that, although specific embodiments of the invention have been described herein for purposes of illustration, various modifications may be made without deviating from the spirit and scope of the invention

What is claimed is:

1. A bioreactor comprising:
a compostable material; and
at least one bioreactor cell located in the compostable material wherein the bioreactor cell further comprises:
a sloped first porous material layer having a length X, a width Y, a bottom surface and a top surface and including at least one trench;
a second porous material located in the at least one trench, the second porous material extending out of the at least one trench and above the top of the first porous material layer; and
at least one perforated gas collection pipe that is located in and substantially covered by the second porous material wherein the first porous material layer has a length X of from about 100 feet to about 1000 feet and a width Y of from about 60 feet to about 1000 feet and wherein the bioreactor does not include a covering barrier material.

2. The bioreactor of claim 1 wherein the at least one perforated gas collection pipe is located in the second porous material at a position corresponding to about the top surface of the first porous material layer.

3. The bioreactor of claim 1 wherein a compostable material lies below the first porous material layer.

4. The bioreactor of claim 1 wherein the at least one trench in the first porous material has a length corresponding to the length of a perforated portion of the perforated gas collection pipe and wherein all of the perforated portion lies in a second porous material a portion of which is located in the trench.

5. The bioreactor of claim 1 wherein sensors selected from thermocouples and pressure sensor are located in the second porous material.

6. A bioreactor comprising:
a compostable material; and
at least one bioreactor cell located in the compostable material wherein the bioreactor cell further comprises:
a sloped first porous material layer having a length X, a width Y, a bottom surface and a top surface and including at least one trench;
a second porous material located in the at least one trench, the second porous material extending out of the at least one trench and above the top of the first porous material layer; and
at least one perforated gas collection pipe that is located in and substantially covered by the second porous material wherein the first porous material and the second porous material are each selected from tire chips, gravel, stone, wood chips, glass, cullet, tire chips, selected construction and demolition debris, or any combination thereof.

7. The bioreactor of claim 6 wherein the first porous material and the second porous material are different materials.

8. The bioreactor of claim 7 wherein the first porous material is tire chips and the second porous material is gravel.

9. The bioreactor of claim 1 wherein the first porous material layer has a depth ranging from about 12 inches to about 4 feet or more.

10. The bioreactor of claim 1 wherein the first porous material layer is sloped from about 0.5 degrees to about 10 degrees from horizontal.

11. The landfill of claim 1 including at least two bioreactors of claim 1 wherein the bioreactors are vertically separated by a layer of compostable material having a depth of from about 50 feet to about 150 feet.

12. A bioreactor comprising:
a compostable material; and
at least one bioreactor cell located in the compostable material wherein the bioreactor cell further comprises:
a sloped first porous material layer having a length X, a width Y, a bottom surface and a top surface and including at least one trench;
a second porous material located in the at least one trench, the second porous material extending out of the at least one trench and above the top of the first porous material layer; and
at least one perforated gas collection pipe that is located in and substantially covered by the second porous material wherein the bioreactor cell has a first end and a second end wherein the first end lies above the second end, wherein the at least one trench is associated with the bioreactor second end and wherein at least one leachate collection pipe is located in the at least one trench wherein the second porous material is mounded above the leachate drain.

13. The bioreactor of claim 12 wherein the first porous material and the second porous material are each selected from tire chips, gravel, stone, wood chips, glass, cullet, tire chips, selected construction and demolition debris, or any combination thereof.

14. The bioreactor of claim 13 wherein the first porous material and the second porous material are different materials.

15. The bioreactor of claim 13 wherein the first porous material is gravel and the second porous material is tire chips.

16. The bioreactor of claim 12 wherein the at least one leachate collection pipe is a horizontal perforated pipe.

17. A method for constructing a landfill bioreactor comprising the steps of:
a. placing a layer of compostable material in a landfill;
b. locating a layer of a first porous material on top of the compostable material layer;
c. removing a portion of the first porous material from the porous material layer to form at least one trench;

d placing a second porous material into the at least one trench;

e. placing a gas collection pipe on top of the second porous material; and f. covering the gas collection pipe with additional second porous material to form a second porous material covered gas collection pipe.

18. The method of claim 17 wherein the second porous material is placed in the trench in step d in an amount sufficient to bring to fill the trench with second porous material such that a top surface of the second porous material and the top surface of the first porous material layer are essentially co-planar.

19. The method of claim 18 wherein one or more sensors are located in the trench before the trench is completely filled with second porous material.

* * * * *